United States Patent [19]

Gerteis

[11] 4,193,874

[45] Mar. 18, 1980

[54] FILTER CENTRIFUGE

[75] Inventor: Hans Gerteis, Bietigheim-Bissingen, Fed. Rep. of Germany

[73] Assignee: Firma Heinkel Industriezentrifugen GmbH & Co., Fed. Rep. of Germany

[21] Appl. No.: 883,721

[22] Filed: Mar. 6, 1978

[30] Foreign Application Priority Data

Mar. 11, 1977 [DE] Fed. Rep. of Germany ....... 2710624

[51] Int. Cl.[2] ............................................ B01D 33/10

[52] U.S. Cl. .................................... 210/232; 210/370; 210/380 H

[58] Field of Search ............ 210/232, 370, 380, 380 H

[56] References Cited

U.S. PATENT DOCUMENTS

| | | | |
|---|---|---|---|
| 1,292,758 | 1/1919 | Gonzalez | 210/370 |
| 3,269,028 | 8/1966 | Strich | 210/380 |
| 3,411,631 | 11/1968 | Elsken et al. | 210/380 |
| 3,438,500 | 4/1969 | Pico | 210/370 |
| 3,483,991 | 12/1969 | Humphrey | 210/380 |
| 3,491,888 | 1/1970 | Colburn et al. | 210/380 |
| 3,623,613 | 11/1971 | Quetsch | 210/370 |
| 3,684,099 | 8/1972 | Kiebach | 210/380 |
| 3,774,769 | 11/1973 | Smith | 210/232 |

FOREIGN PATENT DOCUMENTS

| | | | |
|---|---|---|---|
| 1025343 | 2/1958 | Fed. Rep. of Germany | 210/380 |
| 1911147 | 12/1971 | Fed. Rep. of Germany | 210/370 |

*Primary Examiner*—Benoit Castel
*Assistant Examiner*—David R. Sadowski
*Attorney, Agent, or Firm*—Kenway & Jenney

[57] ABSTRACT

A filter centrifuge for the separation of solid and liquid components in a suspension in which a filter cloth is used. The filter cloth is inserted in the drum of the centrifuge and is removably fastened at one side about the periphery of an aperture in the drum. The filter cloth is flexible and may be turned inside out to discharge solid materials after the centrifuging operation. To prevent the flexible filter cloth from becoming pressed into the openings of the centrifuge drum by the force of the centrifuging process and the weight of the solid material, a supporting screen is inserted between the inner wall and the drum of the filter cloth. The screen is in the form of longitudinal rods from which the filter cloth is easily removed even if the gaps between the rods are penetrated to a slight extent.

17 Claims, 8 Drawing Figures

FILTER CENTRIFUGE

Figure 1:
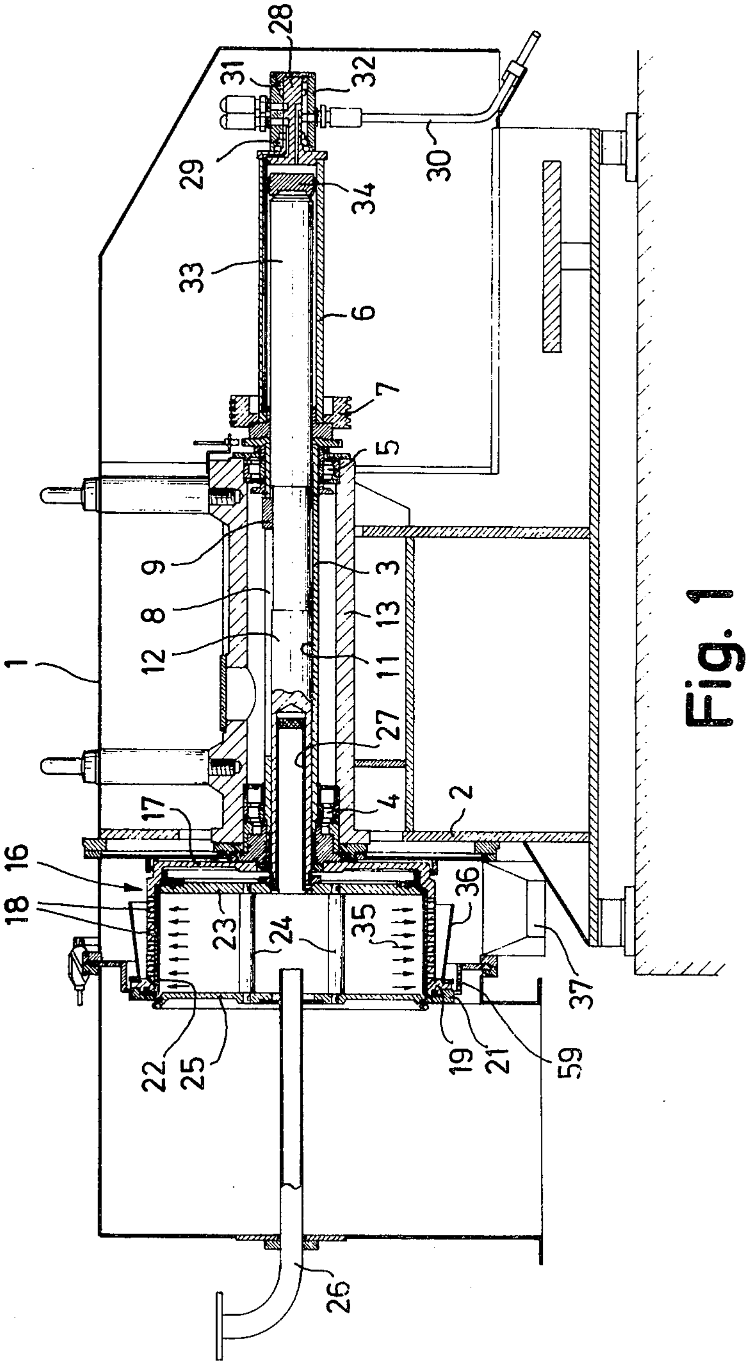

The invention concerns a filter centrifuge for the separation of solid and liquid components in a suspension, with a centrifugal drum with a radial port-hole, positioned rotatably in a centrifuge housing, open on one face, and with a filter cloth which can be inserted in the drum, which is removably fastened on one side to the periphery of the aperture of the drum which is tightly sealable by a centrifuge bowl cover, and on the other side to a base plate rigidly bonded to the cover so as to leave a space between them, wherein the centrifugal drum and the base plate are oriented coaxially to one another, can rotate together, and are movable axially with respect to one another.

In known filter centrifuges of this type (DT-PS 19 11 147) it is difficult to realize the procedure for discharge of solids from the filter cloth upon completion of the centrifuging process in a reliable manner, since the filter cloth which carries the solid layer centrifuged off, must be turned inside out for this purpose. The flexible filter cloth is pressed into the radial discharge openings of the centrifugal drum during the centrifuge operation by centrifugal force, and also under the action of the weight of the solid layer, generally in the shape of cylindrical holes, so that in order to release the cloth from the centrifugal drum and turn it inside out, not only the pure sliding frictional resistance between filter cloth and inner wall of the centrifugal drum must be overcome, but considerably higher resistance forces. This in turn leads to a strong strain on the filter cloth, which for this reason has only a limited lifetime. The conditions described, furthermore, also impair the production of the centrifuge in the centrifugal process, since the throughput must be limited as a function of the ability to discharge the solid depending upon the product to be filtered.

It is, therefore, an object of the invention to propose a device with whose assistance the inversion process of the filter cloth for discharging the solid layer can be carried out with the smallest possible resistance to its removal, without thereby impairing the secure fastening and the rapid exchangability of the filter cloth. At the same time, it should be possible to replace the filter cloth back into the centrifuge position with as much care as possible and to place it reliably in the interior of the drum.

The objective is attained by the invention by providing a supporting screen between centrifugal drum and filter cloth, with supporting elements on the filter cloth side directed exclusively parallel to the axially running direction of the filter cloth.

The supporting elements of the support screen are formed in the preferred embodiment of the invention on the filter cloth side, as longitudinal rods arranged at close intervals, which are fastened in turn to circularly bent support rods on the side towards the centrifugal drum. Furthermore, it is advantageous to secure a locking plate serving as a mounting support for the support screen, and the filter cloth or a clamping ring for it at the opening edge of the centrifugal drum, by a fastening ring, and to provide this fastening ring with its internal annular opening together with a centrifuge bowl cover at the same time, in order to seal the centrifugal bowl at the discharge, whereby furthermore, sealing strips can be placed in grooves of a drum cover, which provides a sealing of the filtrate area on the outside of this fastening ring.

The following description of preferred embodiments of the invention serve as further explanation in connection with the attached drawings.

Figure 2:
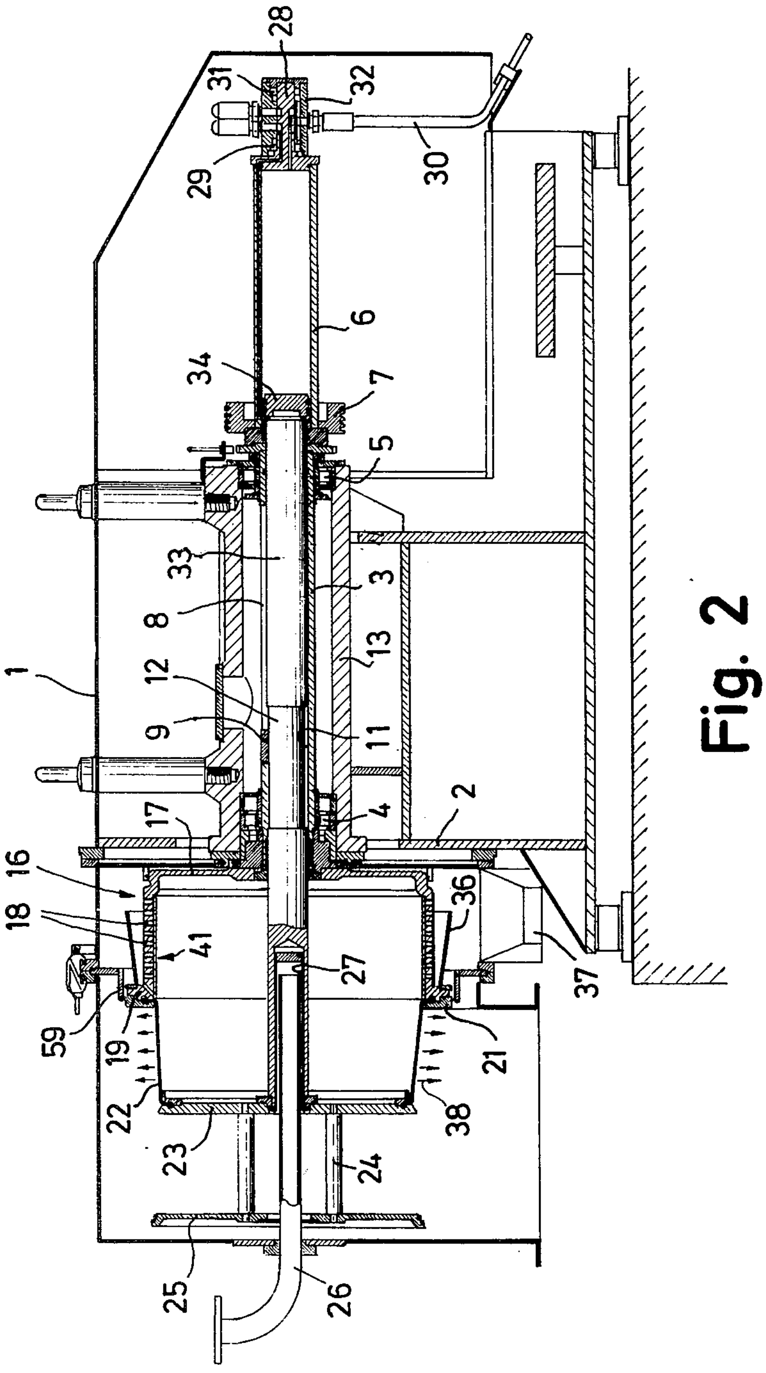
Figure 3:
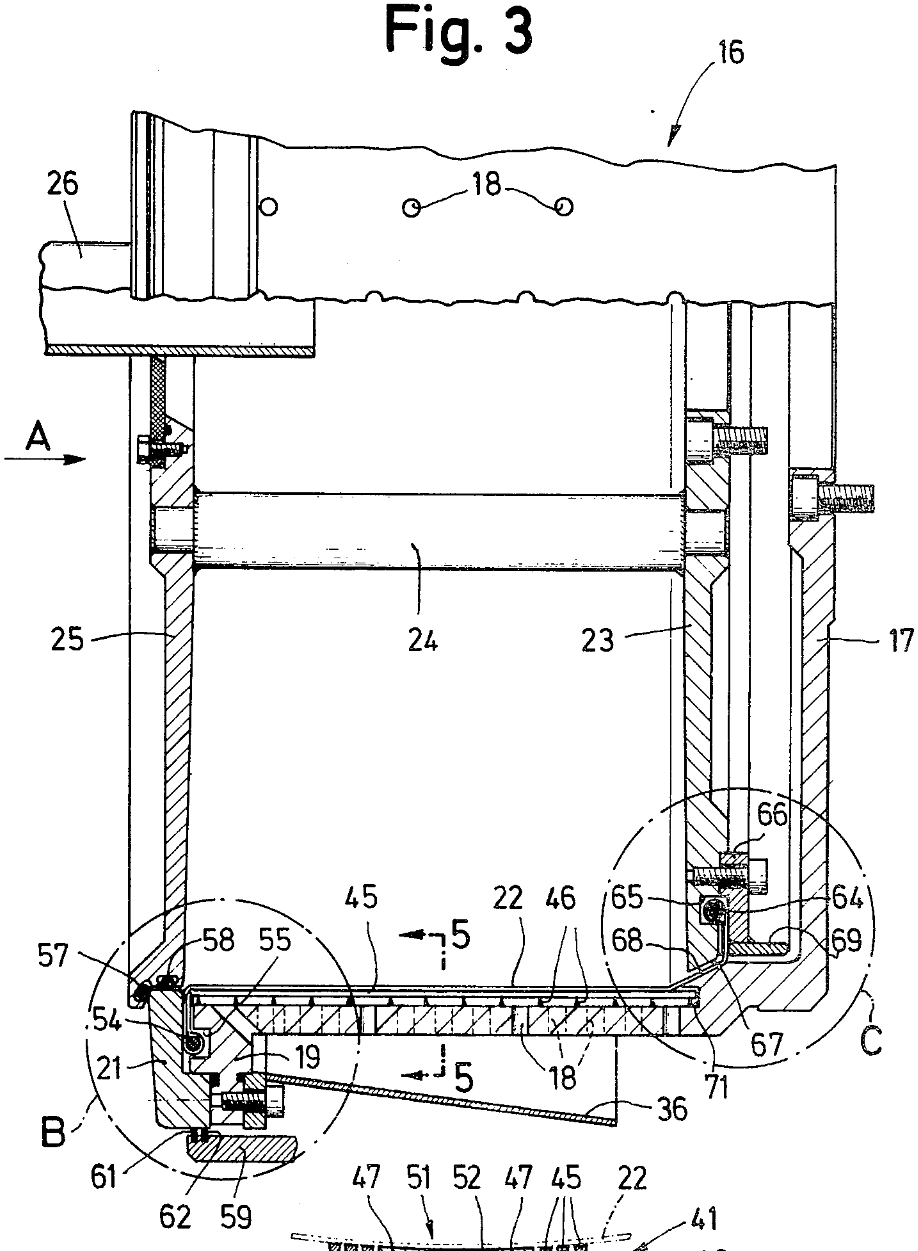
Figure 5:
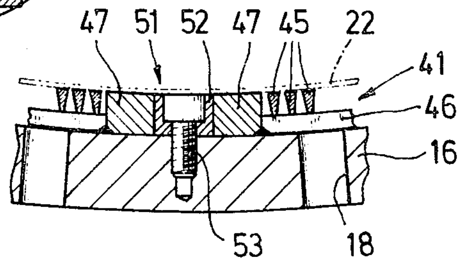
Figure 4:
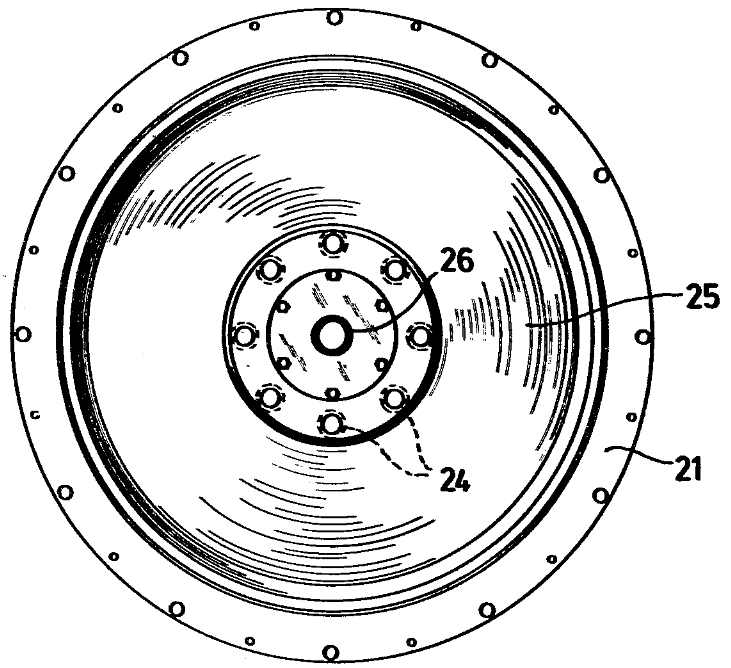
Figure 6:
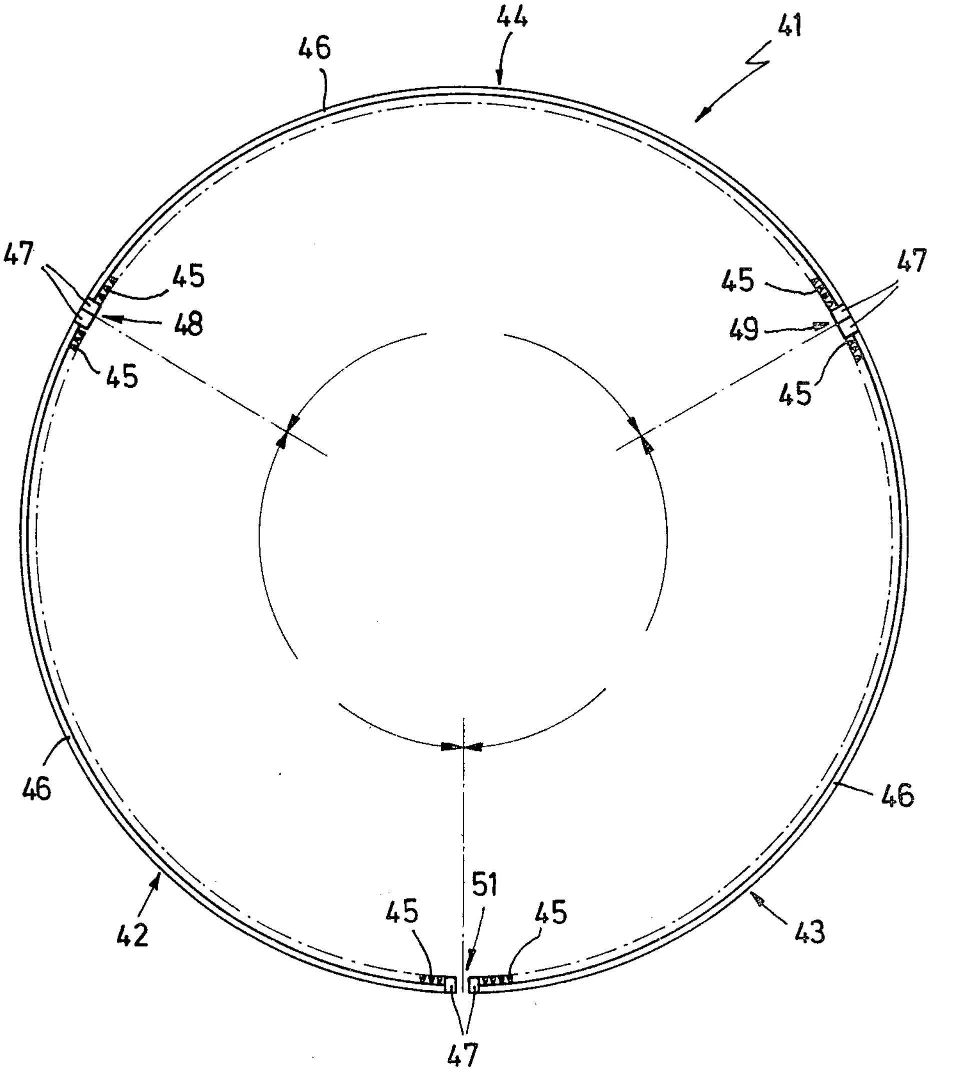
Figure 7:
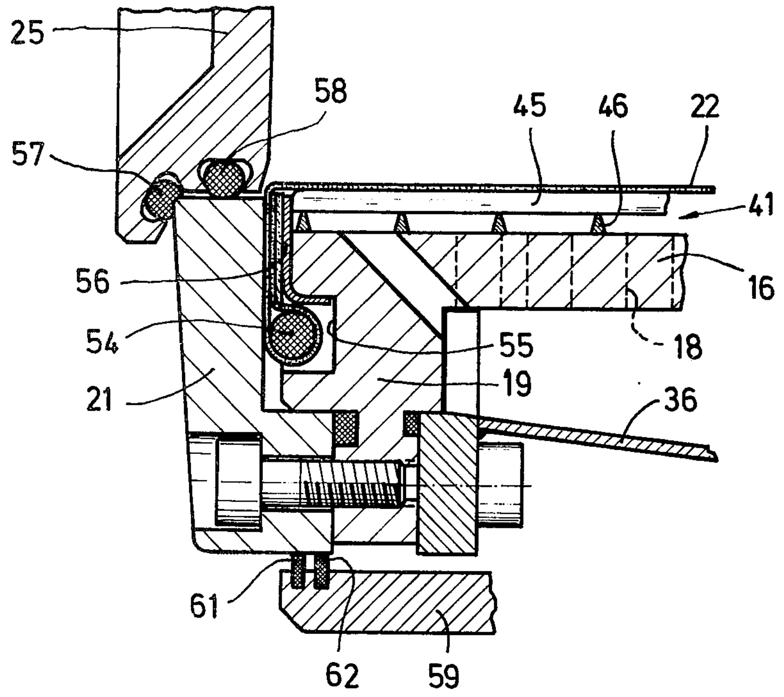

Shown are:

FIG. 1. A schematic sectional view of a filter centrifuge in the operating phase of centrifuging;

FIG. 2. Schematically, the centrifuge of FIG. 1 in the operating phase of discharging the solid;

FIG. 3. An enlarged view of a centrifugal drum;

FIG. 4. A reduced front view of the centrifugal drum in the direction of the arrow A in FIG. 3;

FIG. 5. A schematic view along the line 5—5 in FIG. 3;

FIG. 6. A schematic front view of a support screen;

FIG. 7. An enlarged detail view in the area of circle B in FIG. 3, and

Figure 8:
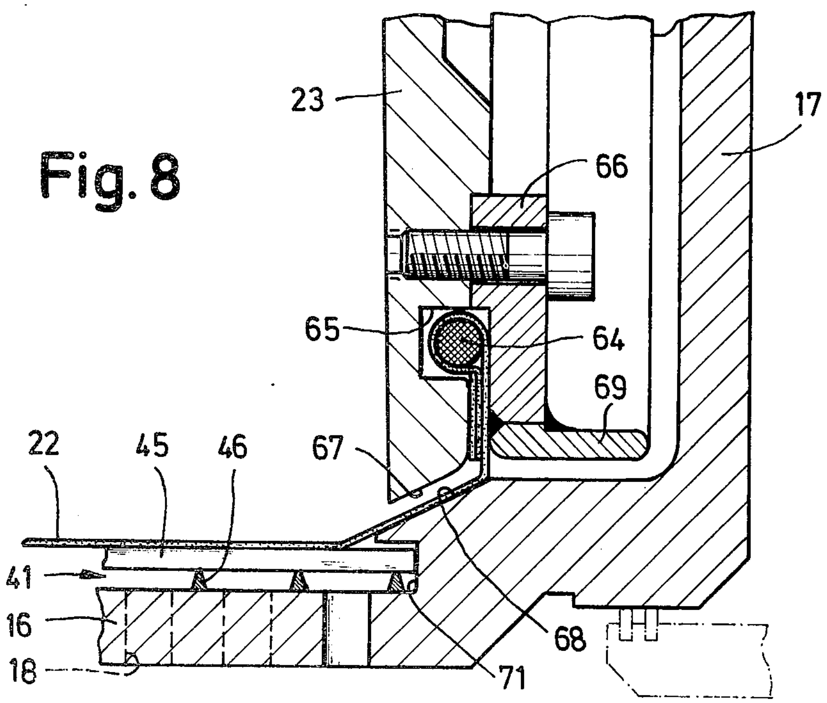

FIG. 8. An enlarged detail view in the area of circle C in FIG. 3.

The illustrated filter centrifuge (cf. particularly FIGS. 1 and 2) includes a simply schematically indicated centrifuge housing 1, which encloses the entire machine tightly, in which a hollow shaft 3 in roller bearings 4, 5, is positioned rotatably on a stationary machine frame 2. A pressure cylinder 6, preferably a hydraulic cylinder, is attached by tightly sealed flange to the end of the hollow shaft 3 extending out over the bearing 5, shown on the right in FIGS. 1 and 2. A drive wheel 7 is attached to rotate in common with this cylinder, by which the hollow shaft 3 and the cylinder 6 can be set into rapid rotation together in known fashion, for example, by means of a belt drive from an electric motor. The hollow shaft 3 passing rigidly between the bearings 4, 5, has a groove 8 directed axially, visible in FIGS. 1 and 2, in which a key 9 can be shifted. This key 9 is connected rigidly with a shaft 12 displaceable in the interior 11 of the hollow shaft 3 formed as a drill hole. The shaft 12, therefore, rotates in common with the hollow shaft 3, but is displaceable axially within it. The shafts 3 and 12 run in a sleeve-shaped housing 13 which also serves as the retainer for the bearings 4, 5, which is supported on the machine frame 2.

A cup-shaped centrifugal drum 16 with its base 17 is flanged to rotate together to the end of the hollow shaft 3 extending outward over the bearing 4, shown on the left in FIGS. 1 and 2. The drum 16 has radially running discharge openings 18 at its cylindrical side wall. The drum 16 is opened at its front face opposite the base 17. To the flange-like opening edge 19 surrounding this open front face is tightly clamped 1 edge of an essentially cylindrical, i.e., endless ring shaped filter cloth 22, in a manner still to be explained later, by means of a fastening ring 21 (cf. also FIGS. 3 and 7). The other edge of this filter cloth 22 is connected tightly in a corresponding manner with a base plate 23, which is connected rigidly with the displaceable shaft 12 which freely penetrates the base 17. To the base plate 23 is rigidly fastened a centrifuge bowl cover 25 by means of separating bolts 24, so as to leave a free space between them, which cover tightly seals the centrifugal bowl of the drum 16 in FIG. 1 by being placed on its opening edge, and is lifted free of the drum in FIG. 2 together with the base plate 23 by axial withdrawal of the shaft 12 from the hollow shaft. A filling pipe 26 is rigidly attached to the front side of the filter centrifuge located on the left in FIGS. 1 and 2, which serves for the introduction of a suspension to be separated into its solid and liquid components into the centrifuge bowl of the drum 16 (FIG. 1), and penetrates into the bore hole 27 of the displaceable shaft 12 in the operating condition of the centrifuge illustrated in FIG. 2.

A machine part 32 is positioned rotatably on a sliding piece 28 fastened firmly to the pressure medium cylinder 6 and rotating together with it, by means of pivot bearing 29, 31. The machine part 32, for example, is prevented from rotating by a rigid pressure medium feed line 30, and therefore, remains at rest when the sliding piece 28 rotates. The feed line 30, furthermore, pressurized medium feed lines not illustrated, of the machine part 32, and the sliding piece 28, provide the feed and discharge of the pressurized medium, preferably a hydraulic fluid, for the back and forth motion of the displaceable shaft 12, whose rear part 33 penetrates as a piston rod into the pressure medium cylinder 6, and is there bolted to a double-acting piston 34. Remote controllable valves are connected with the pressure medium lines in known fashion, and therefore in a way which is not described further in detail, which conduct the pressurized medium through channels in the sliding piece 28 to the one side of the piston 34, so that the piston shifts the base plate 23 into the position shown in FIG. 2 by means of the piston rod 33 and the displaceable shaft 12. Upon corresponding reversal of the valves, also in known fashion, pressurized medium reaches the other side of the piston 34 through a channel provided in the wall of the cylinder 6, and presses the piston into the operating position of the centrifuge shown in FIG. 1.

In operation, the filter centrifuge first assumes the position shown in FIG. 1. The displaceable shaft 12 is drawn back into the hollow shaft 3 and in the pressurized medium cylinder 6, whereby the base plate 23 connected with the shaft 12 lies in the vicinity of the base 17 of the centrifuge drum, and the filter cloth is inverted in the drum in such a way that it lies in the interior of the drum. The filter bowl cover 25, in this case, has been placed tightly on the opening edge of the centrifugal drum 16. Upon rotation of the centrifugal drum, suspension to be filtered is introduced through the filling pipe 26. The liquid components of the suspension enter in the direction of the arrows 35 through the openings 18 of the centrifugal drum, and are conducted to a discharge line 37 by a ring-shaped screen 36 fastened to the drum with rotating baffle plates. The solid particles of the suspension are held back by the filter cloth 22. Upon further rotation of the centrifugal drum, the shaft 12 is now displaced towards the left corresponding FIG. 2, whereby the filter cloth 22 is inverted towards the outside, and the solid particles clinging to it are centrifuged outwards in the direction of the arrows 38 into the centrifuge housing 1. From there, they can be easily conveyed away. In the position shown in FIG. 2, the filling pipe 26 has penetrated through openings which are provided in the cover 25 and in the base plate 23, into the bore hole 27 of the shaft 12. When the discharge of solid particles has been completed under the action of centrifugal force, the filter centrifuge is again returned to the operating position corresponding to FIG. 1 by a shift back of the piston 34, whereupon the filter cloth 22 is again inverted in the opposite direction.

As initially mentioned, when the filter cloth 22 is applied directly to the inner side of the centrifuge drum provided with discharge openings 18, the cloth is pressed into these openings during the centrifuging process, whereby considerable force is to be overcome in the inversion, and the cloth is subjected to increased wear. To remedy this, according to the proposal of the invention, a supporting screen 41 is inserted between the inner wall of the centrifugal drum and the filter cloth, which prevents the direct contact of the filter cloth with the inner wall of the centrifugal drum and, therefore, with the openings 18. This supporting screen 41 consists, as shown in FIGS. 5 and 6, of three circular cup shaped screen elements 42, 43, 44 (FIG. 6), which can be placed against the inner wall of the centrifugal drum 16. Each screen element includes longitudinal rods 45 running axially, which are fastened to sector shaped bracing rods 46 (FIG. 5). If the rods 45 and 46 consist of metal, then their mutual attachment can be carried out by welding or soldering. With other materials, only cementing or interlocking joints are possible. As is seen in FIG. 3, the bent bracing rods 46 are applied to the inner wall of the centrifugal drum 16 in such a way that the spaces between them line up with the discharge openings 18. The longitudinal rods 45, positioned on the opposite sides of the bracing rods 46 facing the filter cloth 22, as shown in FIG. 5, have a sectional profile which narrows radially towards the outside, for example, triangular. The gap width between two longitudinal rods 45 can be between about 0.1 to 0.5 mm, preferably 0.3 mm. In each case, strips 47, for example, also of metal, are firmly fastened (FIGS. 5 and 6) to the ends of the bracing rods 46 in the manner apparent in FIG. 5. After the insertion of the screen elements 42, 43, 44 in the centrifugal drum, as shown in FIG. 6, in each case two adjacent strips 47 are placed flush against one another at the junction points 48, 49. A preferably slightly key-shaped axially extending element 52 is pressed into the remaining gap at the junction point 51—cf. FIG. 5—and attached to the wall of the drum 16 by a bolt 53. Care is to be taken at this point to provide that a smooth inner surface results at each junction point. At the junction points 48 and 49, strips 47 lying next to one another can be connected with one another by key joints, for example, by axially extending grooves and splines, to provide additional interlocking. The mentioned bolt 53 is not absolutely necessary, since as a rule, good retention of the supporting screen in the centrifugal drum can be produced by the clamping of the key-shaped fastening element 52.

As can be seen in FIG. 5, the filter cloth 22 comes into contact merely with the wide base sides of the longitudinal rods 45, which are positioned at very narrow distances from one another. The filter cloth 22 is kept separated from the discharge openings 18 by the rods 45 (and 46), and can therefore, not penetrate into these when centrifuged. In this way, a simple, wear-free inversion of the filter cloth 22 is made possible, since it must simply be loosened in the stripping direction axially from the broad base surfaces of the longitudinal rods 45. Even if the filter cloth 22 should penetrate into the very narrow gaps between the longitudinal rods 45 during the centrifuging, no important resistance is encountered upon stripping.

As is best seen in FIG. 7, the front edge of the filter cloth is folded double and fastened after insertion of a clamping ring 54 at the outside of the filter cloth, for example, by sewing. The clamping ring 54 is inserted into an annular groove 55 at the opening edge 19 of the centrifugal drum, with the portion of the filter cloth surrounding it. The groove 55 also accepts one arm of a retaining plate 56 which is bent down at an angle and bent into a ring shape, whose other arm extends into the interior of the drum and, at that point, lies against the front ends of the longitudinal rods 45. These rods are thereby prevented from axial displacement—towards the left in FIG. 7. The retaining ring or ring flange 21 bolted to the opening edge 19 simultaneously secures the retaining plate 56 and the filter cloth 22 by means of its clamping ring 54 in the groove 55. O-ring gaskets 57, 58 are positioned between the centrifugal bowl cover 25 and the retaining ring 21, the gasket 57 providing an axial seal and the gasket 58, a radial seal. In this way, in an advantageous manner, a retention of the filter cloth 22, an additional positional securing of the support screen 41, and sealing of the centrifuge bowl are simultaneously brought about by the retaining ring 21. Because of this, there results a particularly simple servicing of the machine including the changing of the filter cloth.

With regard to a wear-free inversion of the filter cloth 22, it has been shown to be desirable to give the inner annular opening of the retaining ring 21 a larger diameter than the inside diameter of the supporting screen 41. Preferably, the inside diameter of the retaining ring is greater by twice the material thickness of the filter cloth 22 than the inside diameter of the supporting ring 41 dictated by the base sides of the longitudinal rods 45.

As is further shown from FIG. 7, the retaining ring 21 can exert still another additional function, namely, providing a seal in the direction of the filtrate area, in which is located the discharge line 37. For this purpose, a frontally overhanging ring flange 59 is firmly attached to the machine frame 2, which is provided on its inner side with two adjacent grooves. These grooves accept two sealing strips 61, 62, for example, of teflon, which fit as seals at the circumferential side of the retaining ring 21. In this way, the drum is isolated from the filtrate area.

As illustrated in FIG. 8, in a manner analogous to that described with the use of FIG. 7, an inserted clamping ring 64 is also connected with the other edge of the filter cloth 22. This clamping ring 64, together with the portion of the filter cloth surrounding it, is accepted by an annular groove 65 provided on the back side of the base plate 23. A bolted clamping plate 66 holds the clamping ring 64 in place with the filter cloth 22. As illustrated, the base plate 23 is provided with an inclined surface 67 at its circumference, which changes into a strongly rounded edge at the rear side of the base plate 23. The inclined surface 67 proceeds in such a way that the side of the base plate of greater diameter is turned towards the opening edge 19 of the centrifugal drum 16. The filter cloth 22, formed as an endless ring, has a conical cross-sectional narrowing corresponding to the inclined surface 67 in the area of the base plate 23. An inclined surface 68 is provided on the centrifugal drum 16 itself, parallel to the inclined surface 67. The surface 68 serves as a supporting surface for the filter cloth 22. It has been found to be especially desirable to form the annular gap between the inclined surfaces 67 and 68 in such a way that its width corresponds to about 3 times the thickness of the material of the filter cloth 22. As can also be deduced from FIG. 8, the clamping plate 66 is connected firmly with a guide ring 69 for the filter cloth 22. All of the construction measures described in connection with FIG. 8 serve to provide a reliable wear-free inversion of the filter cloth in both directions.

Finally, it is also illustrated in FIG. 8 that an axially running annular groove 71 is formed into the inner part of the centrifugal drum, on the floor of which the longitudinal rods 45 of the supporting screen 41 are supported. The supporting screen is, therefore, held immovably between the retaining plate 56 and the annular groove 71.

The inclined surface 68 serving to support the filter cloth also in addition prevents the fabric of the filter cloth from buckling and as a result, stretching, under the action of the centrifugal force at the position where it is led away from the supporting screen to the fastening position of the base plate 23. If the annular gap between the inclined surfaces 67 and 68 corresponds to about three times the thickness of the material of the filter cloth, a reliable filter cloth unwinding is guaranteed during the inversion process, while avoiding mechanical action on the solid layer. In the return, a careful replacement of the cloth is obtained by the measures mentioned.

The supporting screen 41 and the measures described in connection with it are preferably used in a filter centrifuge corresponding to the example embodiment, in which the centrifugal drum 16 is axially immovable, and the base plate 23 is movable with the centrifuge bowl cover 25 relative to the drum. The measures according to the invention, however, can also be used in filter centrifuges with advantage, in which the base plate 23 is fixed with respect to the centrifuge bowl cover 25, and the centrifugal drum 16 is movable relative to them.

I claim:

1. Filter centrifuge for the separation of solid and liquid components found in a suspension, with a centrifugal drum open at one front side, with radial discharge openings, positioned rotatably in a centrifuge housing, and with a filter cloth insertable in the drum, which is removably fastened on the one side to the opening edge of the drum which is tightly sealed by a centrifuge bowl cover, and on the other side to a base plate rigidly joined with the cover in such a way as to leave an open space between them, wherein the centrifugal drum and the base plate are arranged coaxially with one another, and can be set into rotation together, and are movable axially with respect to one another, characterized in that a supporting screen (41) is provided between the centrifugal drum (16) and the filter cloth (22), said supporting screen comprising support elements which are both in direct contact with said filter cloth and oriented exclusively parallel to the center axis of said centrifugal drum and to the axial direction of stripping of the filter cloth.

2. Centrifuge according to claim 1, characterized in that the supporting screen (41) is constructed of at least 2 screen elements (42, 43, 44) which can be applied to the inner wall of the centrifugal drum (16), which are retained within the centrifugal drum by means of at least one fastening element (52, 53), and are secured against axial displacement by a retaining plate (56) fastenable to the opening edge (19) of the centrifugal drum.

3. Centrifuge according to claim 2, characterized in that the screen elements (42, 43, 44) on the filter cloth side are constructed of longitudinal bars arranged at narrow intervals (45), which are fastened to circularly bent support bars (46) on the side turned towards the centrifugal drum (16).

4. Centrifuge according to claim 3, characterized in that the gaps between the support bars (46) and the screen elements (42, 43, 44) correspond with the discharge openings (18) of the centrifugal drum (16).

5. Centrifuge according to claim 4, characterized in that the filter cloth (22) is fastenable to the base plate (23) by means of a clamping disk (66) in an annular groove (65) at the rear side of the base plate turned away from the opening edge of the centrifugal drum (16).

6. Centrifuge according to claim 5, characterized in that the base plate (23) is provided at its circumference with an inclined surface (67) and rounded edges, wherein the side of the base plate of greater diameter is turned towards the opening edge (19) of the centrifugal drum (16).

7. Centrifuge according to claim 6, characterized in that the filter cloth (22), formed as an endless ring, has a cross-sectional narrowing in the area of the base plate (23) corresponding essentially with the inclined surface (67) of the base plate.

8. Centrifuge according to claim 6, characterized in that the centrifugal drum (16) has an inclined surface (68) corresponding with the inclined surface (67) of the base plate (23), serving as a filter cloth support.

9. Centrifuge according to claim 8, characterized in that the annular gap between the inclined surfaces (67, 68) corresponds about to three times the material thickness of the filter cloth (22) in the centrifuging mode of the centrifuge.

10. Centrifuge according to claim 9, characterized in that an axial annular groove (71) is provided in the side of the centrifugal drum (16) lying opposite its opening edge (19), for the introduction of the supporting screen (41).

11. Centrifuge according to claim 10, characterized in that the clamping disk (66) is provided with a guide ring (69) fixed to the periphery of said disk and in contact with said filter cloth.

12. Centrifuge according to claim 11, characterized in that the retaining plate (56) and the filter cloth (22) or its clamping ring (54) are secured in the groove (55) by means of a retaining ring (21) bolted to the opening edge (19) of the centrifugal drum (16), and the retaining ring (21) is provided with a centrifuge bowl cover (25) together with its inner ring opening, at the same time to seal off the discharge side of the centrifugal drum.

13. Centrifuge according to claim 12, characterized in that radially and axially sealing gaskets are arranged between the centrifuge bowl cover (25) and the retaining ring (21).

14. Centrifuge according to claim 12, characterized in that the diameter of the inner ring opening of the retaining ring (21) corresponds to the inside diameter of the supporting screen (41) plus twice the material thickness of the filter cloth (22).

15. Centrifuge according to claim 14, characterized in that a conically expanding, ring-shaped baffle plate (36) is provided at the opening edge (19) of the centrifugal drum (16) to carry off the filtrate.

16. Centrifuge according to claim 15, characterized in that sealing strips (61, 62) are inserted in grooves of a ring flange (59) serving as a drum cover, which provide a sealing off of the filtrate area at the outside of the retaining ring (21).

17. Centrifuge according to claim 1, characterized in that an annular groove (55) is provided in the opening edge of the centrifugal drum (16) for simultaneous acceptance of the filter cloth (22) equipped with a clamping ring (54) and a shaped edge of the retaining plate (56).

* * * * *